(12) United States Patent
Chen et al.

(10) Patent No.: US 11,955,649 B2
(45) Date of Patent: Apr. 9, 2024

(54) COVER PLATE ASSEMBLY FOR LITHIUM ION BATTERY AND ENERGY STORAGE DEVICE

(71) Applicant: ChangZhou Microbat Technology Co. Ltd., Jiangsu (CN)

(72) Inventors: Guo Chen, Jiangsu (CN); Jiawen Luo, Jiangsu (CN); Yunfeng Xue, Jiangsu (CN)

(73) Assignee: CHANGZHOU MICROBAT TECHNOLOGY CO. LTD., Jiangsu (CN)

( * ) Notice: Subject to any disclaimer, the term of this patent is extended or adjusted under 35 U.S.C. 154(b) by 639 days.

(21) Appl. No.: 17/254,663

(22) PCT Filed: Apr. 17, 2019

(86) PCT No.: PCT/CN2019/082961
§ 371 (c)(1),
(2) Date: Dec. 21, 2020

(87) PCT Pub. No.: WO2020/199248
PCT Pub. Date: Oct. 8, 2020

(65) Prior Publication Data
US 2021/0151825 A1  May 20, 2021

(30) Foreign Application Priority Data

Apr. 4, 2019  (CN) .......................... 201910272357.8
Apr. 4, 2019  (CN) .......................... 201920460119.5

(51) Int. Cl.
*H01M 50/148*   (2021.01)
*H01M 10/0525*  (2010.01)
(Continued)

(52) U.S. Cl.
CPC ..... *H01M 50/148* (2021.01); *H01M 10/0525* (2013.01); *H01M 50/107* (2021.01); (Continued)

(58) Field of Classification Search
None
See application file for complete search history.

(56) References Cited

U.S. PATENT DOCUMENTS 4,047,292 A * 9/1977 Shaffer ............... H01M 50/186
                                                              429/174
7,553,581 B2    6/2009 Sugimune et al.
(Continued)

FOREIGN PATENT DOCUMENTS

CN         1619860 A     5/2005
CN        202042526 U   11/2011
(Continued)

*Primary Examiner* — Carlos Barcena
(74) *Attorney, Agent, or Firm* — SALIWANCHIK, LLOYD & EISENSCHENK

(57) ABSTRACT

The present disclosure relates to a cover plate assembly for a lithium ion battery and a lithium ion battery. The cover plate assembly includes a cover plate body, provided at a middle portion thereof with a through hole which extends to form a tube body, and the tube body protrudes from at least one surface of the cover plate body; a pressure relief portion, wherein the pressure relief portion is located in the tube body and is in sealed communication with the tube body, the pressure relief portion is ring-shaped and is configured to crack and split from the cover plate body in response to deformation of the cover plate body; and a central conductor, embraced by the pressure relief portion and runs through the pressure relief portion along the axial direction. The cover plate assembly features excellent safety performance and small space occupation.

12 Claims, 3 Drawing Sheets

(51) Int. Cl.
*H01M 50/103* (2021.01)
*H01M 50/107* (2021.01)
*H01M 50/147* (2021.01)
*H01M 50/157* (2021.01)
*H01M 50/176* (2021.01)
*H01M 50/179* (2021.01)
*H01M 50/586* (2021.01)

(52) U.S. Cl.
CPC ....... *H01M 50/147* (2021.01); *H01M 50/157* (2021.01); *H01M 50/179* (2021.01); *H01M 50/103* (2021.01); *H01M 50/176* (2021.01); *H01M 50/586* (2021.01)

(56) References Cited

U.S. PATENT DOCUMENTS

| | | | | |
|---|---|---|---|---|
| 2004/0091770 | A1* | 5/2004 | Kim .................... | H01M 50/531 29/623.2 |
| 2011/0091753 | A1* | 4/2011 | Wang .................. | H01M 50/109 429/94 |
| 2011/0171510 | A1* | 7/2011 | Suzuki .................... | C22C 24/00 429/101 |
| 2013/0004834 | A1* | 1/2013 | Jiang ................... | H01M 50/566 429/181 |

FOREIGN PATENT DOCUMENTS

| | | |
|---|---|---|
| CN | 109216596 A | 1/2019 |
| CN | 109980149 A | 7/2019 |
| JP | H107282843 A | 10/1995 |

* cited by examiner

COVER PLATE ASSEMBLY FOR LITHIUM ION BATTERY AND ENERGY STORAGE DEVICE

CROSS REFERENCE TO RELATED APPLICATIONS

This application is a National Stage of International Application No. PCT/CN2019/082961, filed on Apr. 17, 2019, which claims priority to Chinese Patent Application No. 201910272357.8, filed on Apr. 4, 2019, and Chinese Patent Application No. 201920460119.5, filed on Apr. 4, 2019; all of which are hereby incorporated by reference in their entireties.

TECHNICAL FIELD

The present disclosure relates to the field of energy conversion technology, and more particularly to a cover plate assembly for a lithium ion battery and an energy storage device.

BACKGROUND

Existing lithium-ion batteries, especially high-power lithium-ion batteries for power supplies, have been designed to have an explosion-proof pressure relief structure or device, to ensure that the lithium-ion batteries can be subjected to pressure relief timely whenever its internal gas pressure rises excessively during long-term use or thermal runaway, thereby preventing explosion.

In some technical solutions, there is provided a cap which functions to relieve pressure and prevent explosion. The cap includes an upper cover, a lower cover, and a rupture disc positioned between the upper cover and the lower cover. When the internal gas pressure exceeds a rated value, the rupture disc is blown to broken to relieve the pressure. The pressure relief structure is typically used in a cover plate of a cylindrical lithium ion battery. The pressure relief structure functions to shut off and release pressure at the same time. However, it has disadvantages such as a complicated structure with a large number of particles difficult to assemble, and undesirable space utilization due to taking up a large space by excessive height.

Therefore, it is necessary to provide a new technical solution to solve the above technical problems.

SUMMARY

An object of the present disclosure is to provide a new technical solution of a cover plate assembly for a lithium ion battery.

According to a first aspect of the present disclosure, there is provided a cover plate assembly for a lithium ion battery. The cover plate assembly includes a cover plate body, provided at a middle portion thereof with a through hole which extends to form a tube body, wherein the tube body protrudes from at least one surface of the cover plate body; a pressure relief portion, located in the tube body and is in sealed communication with the tube body, the pressure relief portion is ring-shaped and is configured to crack and split from the cover plate body in response to deformation of the cover plate body; and a central conductor, embraced by the pressure relief portion and runs through the pressure relief portion along the axial direction.

Optionally, the pressure relief portion is made of an inorganic nonmetal material.

Optionally, the pressure relief portion is made of glass or ceramic.

Optionally, the tube body protrudes from one of the surfaces of the cover plate body, and the cover plate body, the pressure relief portion and the central conductor are flush at their respective sides away from the tube body.

Optionally, the cover plate body and the central conductor each serves as one electrode of the lithium ion battery; and the pressure relief portion includes an extension which covers the end surface of a free end of the tube body.

Optionally, an outer edge of the cover plate body extends to one side to form a ring-shaped connecting portion.

Optionally, the tube body is perpendicular to the cover plate body.

Optionally, a portion of the tube body connected to the cover plate body is defined as a root portion, and an outer chamfer is formed on an outer side of the root portion.

Optionally, a portion of the tube body connected to the cover plate body is defined as a root portion, an inner chamfer is formed on an inner side of the root portion, and the pressure relief portion is filled in a region defined by the inner chamfer.

Optionally, the central conductor protrudes from at least one end surface of the pressure relief portion.

Optionally, the outer surface of the cover plate is provided with an insulating layer, the insulating layer covers an upper end surface of the pressure relief portion, and an upper end surface of the central conductor is exposed.

According to another embodiment of the present disclosure, there is provided a lithium ion battery. The lithium ion battery includes an energy conversion element; a housing, including a tube portion, wherein the energy conversion element is located within a cavity formed by the tube portion; and the above cover plate assembly, wherein the cover plate body covers one end of the tube portion, and the cover plate body and the central conductor are respectively connected to two electrodes of the energy conversion element.

Optionally, the tube body of the cover plate assembly protrudes into the cavity, and the portion of the energy conversion element corresponding to the tube body and the pressure relief portion forms a recessed structure.

Optionally, a gap is formed between the central conductor and the recessed structure, the central conductor is connected to one electrode of the energy conversion element by a tab, and the tab forms a telescopic structure in the gap.

According to yet another embodiment of the present disclosure there is provided a lithium ion battery. The lithium ion battery includes: an energy conversion element; a housing, wherein the housing includes a tube portion, and the energy conversion element is located in the tube portion; and the above cover plate assembly, wherein the cover plate body covers one end of the tube portion, and the cover plate body and the central conductor are respectively connected to two electrodes of the energy conversion element; and the end of the tube portion forms an inward tapering portion, and the ring-shaped connecting portion sleeves the outer side of the tapering portion.

According to one embodiment of the present disclosure, since the cover plate body, the pressure relief portion, and the central conductor are located in a same layer, and thus have a smaller thickness and occupy less space in the height direction. Such a structure is simpler and easier to assemble compared with a multilayered cover plate assembly.

In addition, the pressure relief portion can function to relieve pressure, thereby improving safety performance of the lithium ion battery.

In addition, the central conductor has a conducting function, and the cover plate assembly can serve as at least one electrode of the lithium ion battery.

In addition, better sealing connection can be formed between the tube body and the pressure relief portion, so that a better sealing effect can be achieved even under the condition that the thickness of the cover plate body is relatively small. It is suitable for a small energy storage element such as a needle battery and a button battery.

Other features and advantages of the present disclosure will become apparent from the following detailed description of exemplary embodiments of the present disclosure with reference to the accompanying drawings.

BRIEF DESCRIPTION OF THE DRAWINGS

The accompanying drawings, which are incorporated in and constitute a part of the description, illustrate embodiments of the present disclosure and, together with the description thereof, serve to explain the principles of the present disclosure.

REFERENCE SIGNS

Figure 1:
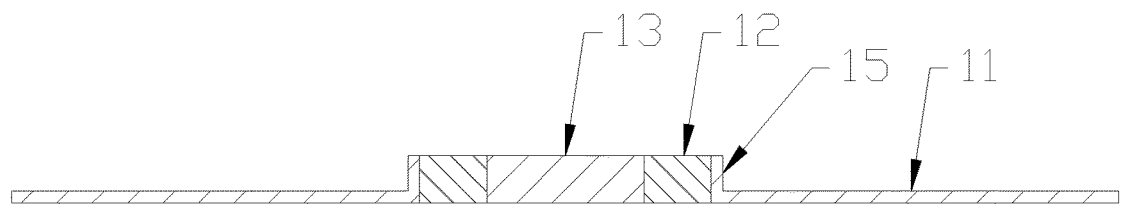
FIG. 1 is a cross-sectional view of a cover plate assembly according to an embodiment of the present disclosure.

11: cover plate body; 12: pressure relief portion; 13: central conductor; 14: gap; 15: tube body; 16: insulating layer; 19: cell; 20: central column; 21: extension; 22: telescopic structure; 23: ring-shaped connecting portion; 24: tube portion; 25: bottom; 26: tapering portion.

DETAILED DESCRIPTION

Various exemplary embodiments of the present disclosure will now be described in detail with reference to the accompanying drawings. It should be noted that the relative arrangement, numerical expressions and numerical values of the components and steps set forth in these examples do not limit the scope of the disclosure unless otherwise specified.

The following description of at least one exemplary embodiment is in fact merely illustrative and is in no way intended as a limitation to the present disclosure and its application or use.

Techniques, methods, and apparatus known to those of ordinary skill in the relevant art may not be discussed in detail but where appropriate, the techniques, methods, and apparatus should be considered as part of the description.

Among all the examples shown and discussed herein, any specific value should be construed as merely illustrative and not as a limitation. Thus, other examples of exemplary embodiments may have different values.

It should be noted that similar reference numerals and letters denote similar items in the accompanying drawings, and therefore, once an item is defined in a drawing, and there is no need for further discussion in the subsequent accompanying drawings.

According to an embodiment of the present disclosure, there is provided a cover plate assembly for a lithium ion battery. The cover plate assembly includes a cover plate body 11, a pressure relief portion 12, and a central conductor 13.

The cover plate body 11 may have a circular shape, a rectangular shape, an elliptical shape, and the like. The whole cover plate body 11 is in the shape of a sheet. The material of the cover plate body 11 is metal, plastic, and the like. For example, the metal includes an iron-based expansion alloy, stainless steel, kovar, and the like.

The cover plate body 11 is provided at a middle portion thereof with a through hole. For example, the through hole is a circular hole, a rectangular hole, an elliptical hole or a hole of another shape.

The through hole extends to form a tube body 15. For example, the tube body 15 and the cover plate body 11 are integrally formed. The tube body 15 protrudes from at least one surface of the cover plate body 11. For example, the tube body 15 is perpendicular to the cover plate body 11, thereby enabling the structure of the pressure relief portion 12 to be more regular.

Of course, in other examples, the included angle between the tube body 15 and the cover plate body 11 may be an acute or obtuse angle. In this way, the function of pressure relief can also be achieved.

The pressure relief portion 12 is located in the tube body 15 and is in sealed communication with the tube body 15. The tube body 15 may be a tube body 15 with a constant diameter, such as a cylindrical shape, a rectangular parallelepiped shape or other prismatic shapes. Or the tube body 15 may be a tube body 15 with a varying diameter, such as a prism frustum shape or a truncated cone shape as long as the tube body can form a sealed connection with the pressure relief portion 12.

The pressure relief portion 12 is configured to crack and split from the cover plate body 11 in response to deformation of the cover plate body 11. The pressure relief portion 12 is ring-shaped. The pressure relief portion 12 is made of an insulating material, for example an inorganic nonmetal material. The material is characterized by low resilience, large brittleness, and high crack-sensitivity, so that the pressure can be released in time when the internal pressure intensity of the housing body reaches a set value.

For example, when an internal gas pressure of the lithium ion battery reaches a set value, the cover plate body 11 is significantly deformed. Such deformation acts on the pressure relief portion 12 through the tube body 15. For example, at least a portion of the tube body 15 extrudes the pressure relief portion 12, so that the pressure relief portion 12 generates the cracks, cracks and splits from the pressure relief portion 12. Both the cracks and the splits can form a gas leakage passage, which allows the internal gas to be released. Alternatively, the cracks are in communication with the splits and form the leak passage.

For example, when the internal gas pressure of the lithium ion battery raises rapidly, at least a portion of the pressure relief portion 12 split from the tube body 15 due to an internal high pressure, thereby forming a leakage passage for rapid pressure relief.

In other examples, deformation of the cover plate body 11 may be caused by, without limitation, gas pressure. The lithium ion battery may also be deformed due to extrusion of an external force. The deformation causes the pressure relief portion 12 to split off. Once the energy conversion element inside the damaged lithium ion battery generates gas in use, the gas will be released from the through hole.

The central conductor 13 is embraced by the pressure relief portion 12 and runs through the pressure relief portion 12 in an axial direction. The central conductor 13 can be made of metal, such as stainless steel, carbon steel and kovar.

In this example, since the cover plate body 11, the pressure relief portion 12, and the central conductor 13 are located in a same layer, and thus have a smaller thickness and occupy less space in the height direction. The structure is simple and easier to assemble compared with a multilayered cover plate assembly.

In addition, the pressure relief portion 12 can function to relieve pressure, thereby improving safety performance of the lithium ion battery.

Further, the central conductor 13 has a conducting function, and the cover plate assembly can serve as at least one electrode of the lithium ion battery.

In addition, a better sealing connection can be formed between the tube body 15 and the pressure relief portion 12. This enables a better sealing effect even under the condition that the thickness of the cover plate body 11 is relatively small, and is suitable for a small energy storage element such as a needle battery and a button battery.

In one example, the pressure relief portion 12 is made of glass or ceramic. During manufacturing, a glass or ceramic blank is placed in the through hole. The central conductor 13 is embedded in the blank. The blank is then pre-fired, so as to obtain a structural strength, and enabling the pressure relief portion 12 to form a sealed connection with the through hole and the central conductor 13.

For example, when the glass material is used, the pressure relief portion 12 may be glass ceramic, borosilicate glass, phosphate glass or other special glass. The glass may form a solid structure, a hollow structure or a pierced structure as long as the pressure relief requirement is met.

In one example, the tube body 15 protrudes from one of the surfaces of the cover plate body 11. The cover plate body 11, the pressure relief portion 12, and the central conductor 13 are flush at their respective sides away from the tube body 15.

Figure 2:
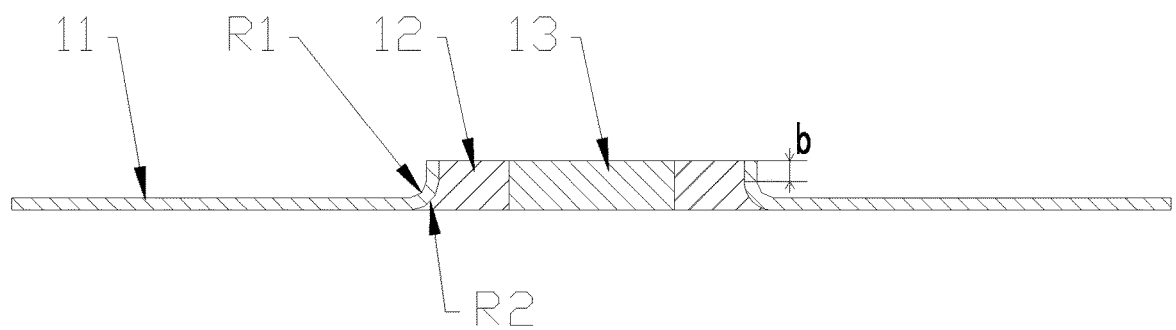
FIG. 2 is a cross-sectional view of a second cover plate assembly according to an embodiment of the present disclosure.

It is defined that after the lithium ion battery is assembled, one surface of the cover plate body 11 close to the cell 19 is an inner surface, and the surface away from the cell 19 is an outer surface. For example, as shown in FIG. 1 and FIG. 2, the tube body 15 protrudes from the outer surface and the inner surface is flush. Thus, the tube body 15 does not occupy the space inside the housing.

Figure 3:
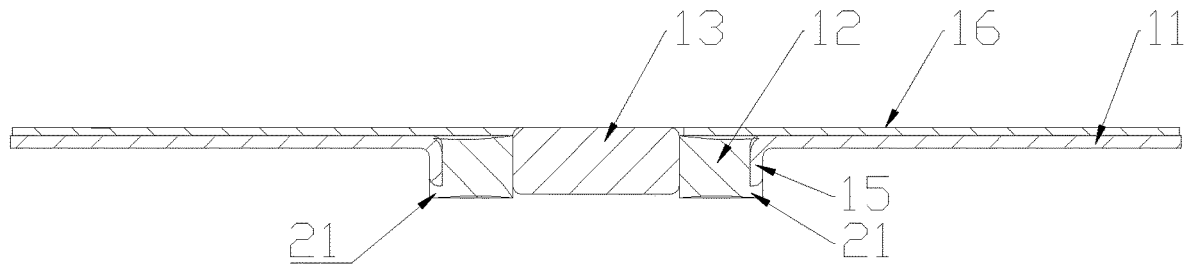
FIG. 3 is a cross-sectional view of a third cover plate assembly according to an embodiment of the present disclosure.

Alternatively, as shown in FIG. 3, the tube body 15 protrudes from the inner surface, and the outer surface is flush. Such structure allows the lithium ion battery to have a regular shape and a high space utilization rate.

In both of the protruding manners, good sealing connection can be formed between the pressure relief portion 12 and the tube body 15.

Figure 4:
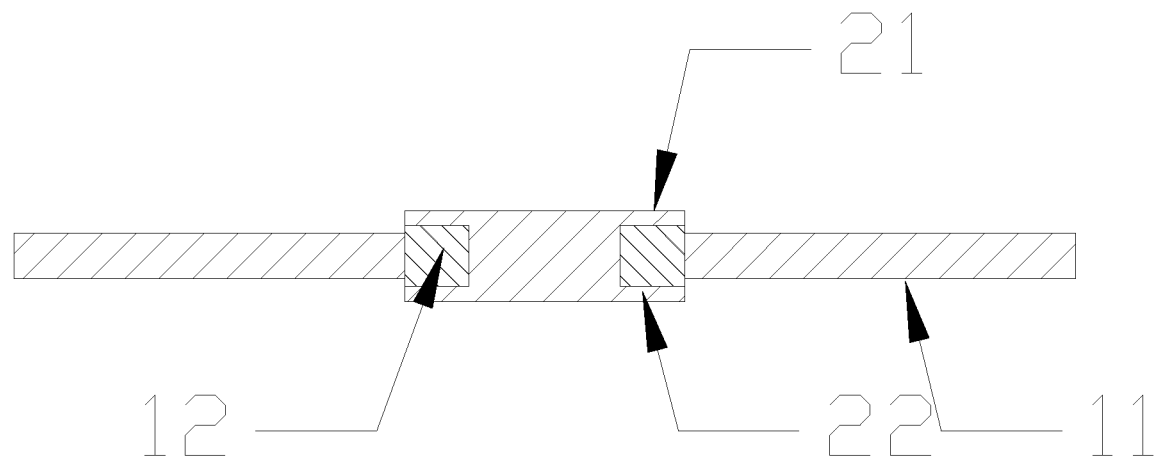
FIG. 4 is a cross-sectional view of a fourth cover plate assembly according to an embodiment of the present disclosure.

In other examples, as shown in FIG. 4, the tube body 15 protrudes toward both the inner surface and the outer surface. Thus, the sealing area between the tube body 15 and the pressure relief portion 12 is larger, and the sealing effect is better, which requires a higher critical pressure value during pressure relief.

In one example, as shown in FIG. 3, the cover plate body 11 and the central conductor 13 each serves as one electrode of the lithium ion battery. For example, the central conductor 13 serves as a positive electrode. The cover plate body 11 serves as a negative electrode. The pressure relief portion 12 includes an extension 21 covering the end surface of the free end of the tube body 15.

The free end refers to an end of the tube body 15 away from the cover plate body 11. When the tube body 15 protrudes from the outer surface, the extension 21 covers the end surface of the free end. When the central conductor 13 is connected to an external circuit by a wire, the wire does not touch the tube body 15 due to the presence of the extension 21, so that short circuit can be effectively prevented.

As shown in FIG. 3, when the tube body 15 protrudes from the inner surface, the extension 21 covers the end surface of the free end. When the central conductor 13 is connected to the cell 19 by a tab or wire, the tab or wire does not touch the tube body 15 due to the presence of the extension 21, so that the short circuit can be effectively prevented.

When the tube body 15 protrudes from the inner surface and the outer surface, the extension 21 covers the end surfaces of both free ends, so that short circuit can also be effectively prevented.

Figure 5:
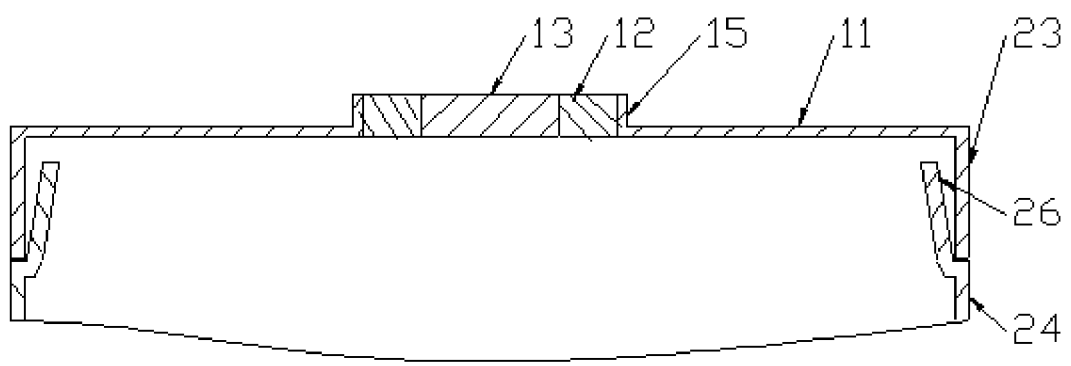
FIG. 5 is an assembled view of a cover plate assembly and a housing according to an embodiment of the present disclosure.

In one example, as shown in FIG. 5, an outer edge of the cover plate body 11 extends to one side to form a ring-shaped connecting portion 23. During assembling, the ring-shaped connecting portion 23 fits on an open end of the housing. For example, the ring-shaped connecting portion 23 fits on an inner side or an outer side of the open end. The ring-shaped connecting portion 23 has a larger connecting area, so that the connection between the cover plate body 11 and the housing becomes easy. For example, laser welding, resistance welding and rolling grooves, and other means may be used for connection.

The portion of the tube body 15 connected to the housing body is defined as a root portion. When the root portion forms a right angle, as shown in FIG. 1, stress concentration is likely to occur at the root portion. Deformation of the housing body generates a relatively large stress at the root portion, causing plastic deformation of the root portion. As such, deformation of the housing body does not cause lateral movement of the tube body 15, that is, deformation of the housing body cannot be propagated to the tube body 15, the tube body 15 does not extrude or stretch the pressure relief portion 12, and no cracks or splits would occur. An explosion-proof element of the lithium-ion battery fails.

In order to solve the technical problem, in one example, an outer chamfer is formed on an outer side of the root portion of the tube body 15 (as shown by R1 in FIG. 2). The outer chamfer can effectively reduce the stress concentration generated at the root portion, so that the deformation of the housing body can be quickly propagated to the tube body 15. Thus, the upper half of the tube body 15 extrudes the pressure relief portion 12, and the lower half stretches the pressure relief portion 12, thereby forming the pressure relief passage more easily.

Further, it is difficult to greatly reduce the height of the pressure relief portion 12, for example, to reduce the height to 0.5 mm or less. While some small lithium-ion batteries require very a small pressure intensity for pressure relief, and the effective height of the pressure relief portion 12 is required to be 0.2 mm, 0.3 mm, 0.4 mm, or even smaller, which, however, is difficult to achieve with existing processing technologies.

In one example, an inner chamfer is formed on an inner side of the root portion of the tube body 15 (as shown by R2 in FIG. 2). The pressure relief portion 12 is filled in a region embraced by the inner chamfer. The pressure relief portion 12 includes a straight section (as shown by b in FIG. 2) and a curved section. An effectively sealed connection is formed between the straight section and the tube body 15.

An effective height of the pressure relief portion 12, i.e., the size of the straight section, determines the pressure intensity for pressure relief. The larger the length of the straight section is, the larger the pressure intensity is required for pressure relief. On the other hand, the smaller the length of the straight section is, the smaller the pressure intensity is required for pressure relief. The portion of the pressure relief portion 12 located in the region embraced by the inner chamfer (i.e., the curved portion) has little effect on the pressure intensity for pressure relief. By providing the inner chamfer, the sealing area between the straight section and the tube body 15 can be effectively reduced, and the effective height of the pressure relief portion 12 can also be reduced.

Thus, even if the overall height of the pressure relief portion 12 is 0.5 mm or more, since there is little influence of the curved portion on the pressure intensity for pressure relief, the effective height of the pressure relief portion 12 can reach 0.2 mm, 0.3 mm, 0.4 mm or even smaller, which allows the explosion-proof element to have a lower pressure intensity for pressure relief. The operation requirements of a small lithium-ion battery, such as a needle battery or a button battery are met.

Figure 6:
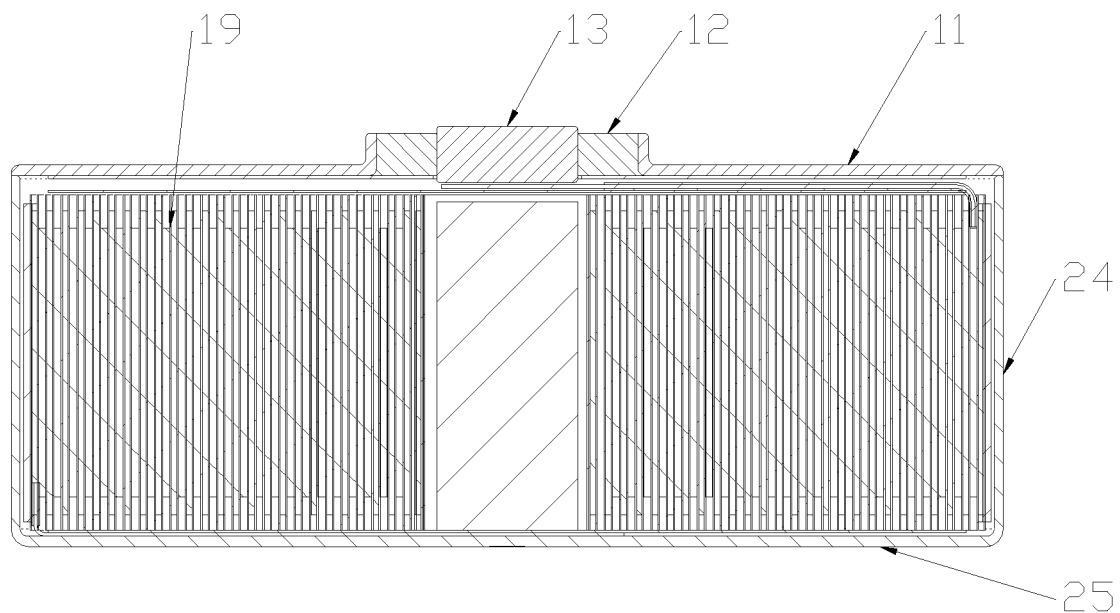
FIG. 6 and FIG. 7 are cross-sectional views of a lithium ion battery according to another embodiment of the present disclosure.
Figure 7:
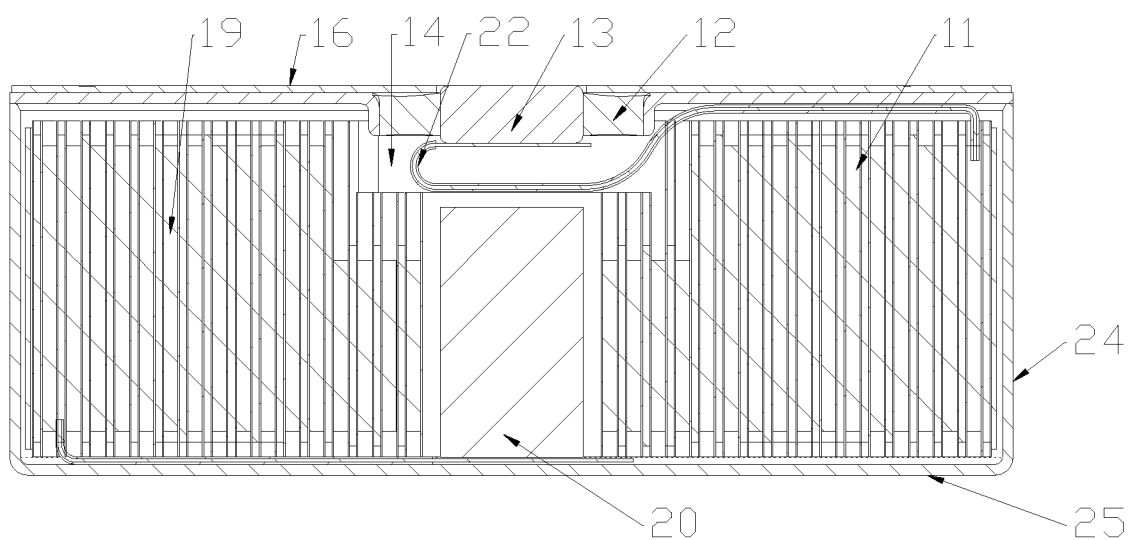

In one example, as shown in FIG. 6 and FIG. 7, the central conductor 13 protrudes from at least one end surface of the pressure relief portion 12. In the example, when the central conductor 13 is electrically connected to other components, for example, via a wire or FPCB, the wire or FPCB is less likely to touch the tube body 15.

In addition, during laser welding, since the central conductor 13 protrudes from the pressure relief portion 12, the wire or the FPCB is more easily to be positioned on the central conductor 13, so that the position of the welding is more accurate.

In one example, as shown in FIG. 7, an insulating layer 16 is provided on an outer surface of the cover plate. The insulating layer 16 covers the upper end surface of the pressure relief portion 12. The upper end surface of the central conductor 13 is exposed.

For example, the insulating layer 16 is a film made of a material such as plastic, rubber and silica gel. The film is bonded to the outer surface of the cover plate and the pressure relief portion 12. The middle portion of the film has a hole through which the central conductor 13 is exposed.

Or, the insulating layer 16 is an insulating coating of an insulating material.

In this example, the wire or FPCB can be effectively prevented by the insulating layer 16 from touching the cover plate body 11 during connection with the central conductor 13. Thus, short circuit can be effectively prevented.

Further, the insulating layer can effectively prevent the pressure relief portion 12 from collision with an external object.

According to another embodiment of the present disclosure, there is provided a lithium ion battery. The shape of the lithium ion battery is a cylindrical shape, a rectangular parallelepiped shape, an elliptical cylindrical shape or the like.

The lithium ion battery includes an energy conversion element, a housing, and the above cover plate assembly. The energy conversion element is configured to perform conversion between chemical energy and electrical energy, for example, a cell 19 of the lithium ion battery or the like.

The housing includes a tube portion 24. For example, the cross section of the tube portion 24 is circular, rectangular, elliptical, or the like. The energy conversion element is located within a cavity formed by the tube portion 24.

The cover plate body 11 covers one end of the tube portion 24. The cover plate body 11 and the central conductor 13 are respectively connected to the two electrodes of the energy conversion element. For example, the cover plate body 11 and the central conductor 13 serve as positive and negative electrodes of the lithium ion battery respectively.

For example, two cover plate assemblies are provided. Two cover plate bodies 11 are respectively provided at opposite ends of the tube portion 24.

Alternatively, one cover plate assembly is provided. The end of the tube portion 24 opposite to the cover plate assembly is a bottom 25. The bottom 25 is integrally formed with the tube portion 24.

The lithium ion battery is characterized in high safety factor and high energy density.

In one example, the tube body 15 of the cover plate assembly protrudes into the cavity. The portion of the energy conversion element corresponding to the tube body 15 and the pressure relief portion 12 forms a recessed structure.

For example, the cell 19 of the lithium ion battery is a rolled structure. The cell 19 includes a central column 20 and a membrane electrode. The membrane electrode includes a positive electrode material, a negative electrode material, and a separating membrane between the positive electrode material and the negative electrode material. The membrane electrode is rolled on the central column 20. A middle portion of the rolled structure forms the recessed structure, that is, there is a fall head between the edge and the middle portion. During assembling, the tube body 15 and the pressure relief portion 12 are located within the recessed structure.

Such arrangement manner takes full advantage of the space inside the housing, thereby allowing the cell 19 to store more electric energy. The lithium-ion battery has higher energy density.

In one example, a gap 14 is formed between the central conductor 13 and the recessed structure. The central conductor 13 is connected to one electrode of the energy conversion element (for example, the positive electrode material of the cell 19) by a tab. The tab forms a telescoping structure 22 within the gap 14. A set length is reserved on the telescopic structure 22, that is, the tab, for the tab to stretch or contract according to actual needs. In this way, a position of the end portion of the tab is not fixed; rather, it can be determined according to actual needs. Hence, accuracy requirements for the assembling of other components can be reduced, and the difficulty in assembling the lithium ion battery is reduced.

For example, the telescopic structure may be, but not limited to, a U-shaped structure, a folded-shaped structure, a wave-shaped structure, and the like, and can be selected by those skilled in the art according to actual needs.

According to yet another embodiment of the present disclosure there is provided a lithium ion battery. As shown in FIG. 5, in such example, the outer edge of the cover plate body 11 extends to one side to form a ring-shaped connecting portion 23, The cover plate body 11 covers one end of the tube portion 24. An energy conversion element (for example, the cell 19) is located within the tube portion 24.

The cover plate body 11 and the central conductor 13 are respectively connected to the two electrodes of the energy conversion element.

The outer edge of the cover plate body 11 extends to one side to form the ring-shaped connecting portion 23. The end of the tube portion 24 forms an inward tapering portion 26. The tapering portion 26 is an inward contracted structure formed at the mouth portion of the tube portion 24. The ring-shaped connecting portion 23 sleeves the outer side of the tapering portion 26. The ring-shaped connecting portion 23 overlaps with the tapering portion 26. For example, the cover plate body 11 may be connected to the housing by means of laser welding, electric resistance welding, rolling grooves, or the like. The ring-shaped connecting portion 23 simplifies the assembling of the cover plate body 11 and the housing.

In one example, the insulation strength of the lithium ion battery exceeds 1000 V. The pressure rating of the lithium-ion battery exceeds the pressure rating of traditional plastic riveted lithium-ion batteries by at least three orders of magnitudes.

While certain specific embodiments of the present disclosure have been illustrated by way of example, it will be understood by those skilled in the art that the foregoing examples are provided for the purpose of illustration and are not intended to limit the scope of the present disclosure. It will be understood by those skilled in the art that the foregoing embodiments may be modified without departing from the scope and spirit of the disclosure. The scope of the present disclosure is subject to the attached claims.

The invention claimed is:

1. A cover plate assembly for a lithium ion battery, comprising:
   a cover plate body, provided at a middle portion thereof with a through hole which extends to a tube body, wherein the tube body protrudes from at least one surface of the cover plate body;
   a pressure relief portion, located in the tube body and is in sealed communication with the tube body, the pressure relief portion is ring-shaped and is configured to crack and split from the cover plate body in response to deformation of the cover plate body; and
   a central conductor, embraced by the pressure relief portion and runs through the pressure relief portion in an axial direction,
   wherein the tube body protrudes from one of the surfaces of the cover plate body, the other surface is flush, and wherein the cover plate body, the pressure relief portion and the central conductor are flush at their respective sides away from the tube body.

2. The cover plate assembly for a lithium ion battery according to claim 1, wherein the pressure relief portion is made of an inorganic nonmetal material.

3. The cover plate assembly for a lithium ion battery according to claim 2, wherein the pressure relief portion is made of glass or ceramic.

4. The cover plate assembly for a lithium ion battery according to claim 2, wherein the cover plate body and the central conductor each serves as one electrode of the lithium ion battery, and the pressure relief portion comprises an extension which covers the end surface of a free end of the tube body.

5. The cover plate assembly for a lithium ion battery according to claim 1, wherein an outer edge of the cover plate body extends to one side to form a ring-shaped connecting portion.

6. The cover plate assembly for a lithium ion battery according to claim 1, wherein the tube body is perpendicular to the cover plate body.

7. The cover plate assembly for a lithium ion battery according to claim 1, wherein a portion of the tube body connected to the cover plate body is defined as a root portion, and an outer chamfer is formed on an outer side of the root portion.

8. The cover plate assembly for a lithium ion battery according to claim 1, wherein a portion of the tube body connected to the cover plate body is defined as a root portion, an inner chamber is formed on an inner side of the root portion, and the pressure relief portion is filled in a region embraced by the inner chamfer.

9. The cover plate assembly for a lithium ion battery according to claim 1, wherein the central conductor protrudes from at least one end surface of the pressure relief portion.

10. The cover plate assembly for a lithium ion battery according to claim 1, wherein the outer surface of the cover plate is provided with an insulating layer, wherein the insulating layer covers an upper end surface of the pressure relief portion, and an upper end surface of the central conductor is exposed.

11. A lithium ion battery, comprising:
    an energy conversion element;
    a housing, comprising a tube portion, wherein the energy conversion element is located within a cavity formed by the tube portion; and
    the cover plate assembly according to claim 1, wherein the cover plate body covers one end of the tube portion, and the cover plate body and the central conductor are respectively connected to two electrodes of the energy conversion element.

12. The lithium ion battery according to claim 11, wherein the tube body of the cover plate assembly protrudes into the cavity, and a portion of the energy conversion element corresponding to the tube body and the pressure relief portion forms a recessed structure.

* * * * *